Patented Feb. 12, 1946

2,394,674

UNITED STATES PATENT OFFICE 2,394,674

PROCESS FOR PRODUCING ARYL METHYL KETONES

William S. Emerson, Dayton, Ohio, assignor to Monsanto Chemical Company, a corporation of Delaware No Drawing. Application February 20, 1943, Serial No. 476,652

9 Claims. (Cl. 260—592)

This invention relates to the manufacture of aryl methyl ketones and more particularly to a process for the manufacture of acetophenone or its nuclear derivatives.

In the preparation of acetophenone the methods followed heretofore have been based particularly upon the Friedel-Crafts reaction, involving the condensation of benzene with acetyl chloride, acetic anhydride, various acetates or ketene in the presence of metal halide catalysts, especially aluminum chloride. Such methods have been characterized by high catalyst costs, the employment of molecular equivalents of, for example, aluminum chloride, being essential in the Friedel-Crafts synthesis of ketones and the recovery of such catalysts in the desirably anhydrous state being impracticable. Acetophenone has likewise been prepared by a variety of other methods, but the prior processes have been of little industrial interest in that they have been characterized not only by high costs but also by uncertain yields and attended with various other difficulties. For example, it was long ago known to heat the ethyl ether of styrene chlorohydrin with alcoholic sodium hydroxide to yield alphaethoxystyrene which may be saponified to acetophenone (Ber. 40, 4996, Ber. 41, 175, 1891, 4459, Ber. 41, 1029, 3711). It has also been observed that styrene iodohydrin decomposes somewhat during distillation to yield acetophenone (Compte rendus, 145, 812). The uncertainty of the yields obtainable by these methods as well as the comparative unavailability of some of the reagents employed make them unsuitable for commercial use.

Now I have found that acetophenone or nuclear derivatives thereof are obtainable in good yields by passing vapors of a halohydrin of a vinyl aromatic compound with steam over a basic catalyst at temperatures substantially within the range of about 150° C. to about 650° C. Of the halohydrins I prefer to employ styrene chlorohydrin or the chlorohydrins of other vinyl aromatic compounds in the preparation of aryl methyl ketones and in practice I operate substantially as follows:

I pack a quartz tube having an internal diameter of, say, 1 inch and length of, say, 18 inches with a basic catalyst, for example, alumina or the oxides of beryllium, magnesium, calcium, zinc, strontium, cadmium, barium or lithium. I apply external heat, raising the temperature of the interior of the tube to from 150° C. to 650° C., depending upon the nature of the catalyst employed. Into the catalyst tube I then introduce through one conductor the volatilized styrene chlorohydrin and through another conductor an excess of superheated steam. Instead of the volatilized chlorohydrin, I may employ the liquid chlorohydrin; in this case, however, I apply heat to the conducting tube in such a manner as to volatilize the reactant before it enters the catalyst tube. When operating on a small scale, the liquid chlorohydrin may also be dropped very slowly at the top of the catalyst chamber, volatilization of the liquid occurring before it comes into contact with the catalyst. The rate at which the steam and the chlorohydrin are passed through the catalyst tube depends upon the heat capacity of the plant. In laboratory experiments, employing the catalyst tube described above, I find that very good results are obtainable by passage of the styrene chlorohydrin at the rate of, say, 1 g. per from 30 to 120 seconds. In selecting both the optimum temperature and the optimum rate of addition of the reactants, care must be observed to maintain both rate and temperature high enough to avoid condensation and low enough to avoid the formation of tarry products in the catalyst chamber. While I am aware of the vapor phase dehydrohalogenation of aliphatic halohydrins into the corresponding aldehydes or ketones, for example, as described in U. S. Patent 2,208,557 to James L. Amos and George W. Hooker, this purely aliphatic reaction could not have anticipated the behavior of styrene chlorohydrin or the chlorohydrins of other vinyl aromatic compounds when submitted to dehydrohalogenating conditions in the vapor phase. Styrene chlorohydrin, being an unsymmetrical molecule, could undergo dehydrohalogenation and rearrangement to either acetophenone or phenylacetaldehyde. In the presence of a basic catalyst the ketone is produced substantially exclusively.

The invention is further illustrated, but not limited, by the following example:

25 g. of styrene chlorohydrin was passed through a quartz tube, packed with activated alumina, for 95 minutes at a temperature of 360° C. to 390° C. and a pressure of 115–125 mm. of mercury. Simultaneously an excess of steam was introduced into the reaction tube. At the end of the run, steam was led through the catalyst tube for approximately 15 minutes in order to drive out any retained reaction products or reactants. The contents of the receiving flask were extracted 3 times with benzene. The benzene extract was combined with washings obtained by treatment of the interior of the catalyst tube with three 25 cc. portions of benzene and the whole was distilled under partial vacuum, 13 g. (67% theoretical yield) of acetophenone, B. P. 83°–90° C./16 mm., $n_D^{25}$ 1.5327, being obtained. The 2,4-dinitrophenylhydrazone melted at 233–234° C. (uncorr.), while the recorded value in the literature is 250° C.

In order to ascertain the effect of reaction time and temperature on the conversion of styrene chlorohydrin into acetophenone, I repeated the above run, employing the same catalyst and reaction tube, but varying the rate of passage of the chlorohydrin through the catalyst chamber and the temperature of the tube. I obtained the following results:

|  | Time | Temperature | Yield of acetophenone |
|---|---|---|---|
|  | *Minutes* | *° C.* | *Grams* |
| Run 2 | 55 | 580–605 | 6.5 |
| Run 3 | 40 | 195–200 | 5.0 |

From the above data it is evident that the better conversions to acetophenone are obtained by conducting the reatcion at temperatures of about 350° C. to about 400° C.

In the above runs, reaction was effected under reduced pressure. Although I find that better conversion to acetophenone is obtained by reaction under diminished pressure, good yields are also obtainable when employing atmospheric or even superatmospheric pressures, the amount of pressure employed varying with the type of reaction equipment used.

Instead of activated alumina, I can employ other basically reacting surface catalysts for the vapor phase conversion of chlorohydrins of vinyl aromatic compounds into the corresponding aryl methyl ketones. I may use for example the alkaline reacting compounds of the elements of groups I, II or III of the periodic table, such as the oxides or carbonates of beryllium, calcium, magnesium, strontium, sodium, potassium, barium, zinc, etc. It is very important that the catalyst employed be one which reacts as a base in the presence of water. By "basically reacting surface catalysts," I mean one which reacts as a base in the presence of water. As has been disclosed in my co-pending application Serial No. 476,623, dated February 20, 1943, the vapor phase treatment of vinyl aromatic chlorohydrins with steam in the presence of neutral, inert catalysts leads to the production of phenylacetaldehyde.

While the above example is limited to the preparation of acetophenone, the present process is also applicable to the preparation of nuclearly substituted acetophenones, for example, the ortho-, meta- or para-tolyl methyl ketones, the xylyl methyl ketones, the nuclearly halogenated acetophenones such as chlorophenyl methyl ketone or bromophenyl methyl ketone, etc., since the presence of the nuclear substituents in the initially employed vinyl aromatic chlorohydrins has substantially no effect on the progress of the reaction.

What I claim is:

1. A process for preparing acetophenone which comprises passing styrene chlorohydrin and steam through a quartz tube packed with activated alumina at a temperature of 360° C. to 390° C.

2. A process according to claim 1 in which a pressure of from 115 to 125 mm. of mercury is employed.

3. A process for preparing acetophenone which comprises passing steam and styrene chlorohydrin through a quartz tube packed with activated alumina at a temperature of 360° to 390° C., introducing additional steam into the reaction tube to drive out any retained reaction products or reactants, extracting the product with a solvent and distilling the extract under a partial vacuum.

4. A process for preparing acetophenone which comprises passing styrene chlorohydrin through a quartz reaction tube packed with activated alumina at a temperature of about 300° C. to about 500° C., the styrene chlorohydrin being introduced into the reaction tube at the rate of 1 gram per 30 to 120 seconds.

5. A process for making acetophenone which comprises passing a mixture of styrene halohydrin vapor and steam into contact with a basically reacting surface catalyst heated to a temperature of from 150° C. to 650° C.

6. A process for making acetophenone which comprises passing a mixture of styrene chlorohydrin vapor and steam into contact with a basically reacting surface catalyst heated to a temperature of from 150° C. to 650° C.

7. A process for making acetophenone which comprises passing a mixture of styrene chlorohydrin vapor and steam into contact with a basically reacting surface catalyst heated to a temperature of from 350° C. to 400° C.

8. A process for making acetophenone which comprises passing a mixture of styrene chlorohydrin vapor and steam into contact with activated alumina heated to a temperature of from 350° C. to 400° C.

9. The process defined in claim 8 in which said mixture of chlorohydrin vapor and steam is maintained at a pressure below normal atmospheric pressure while in contact with said activated alumina.

WILLIAM S. EMERSON.